March 17, 1970 R. E. WINN 3,501,755

MAGNETIC STORAGE MATRIX EMPLOYING MAGNET CORES

Filed April 23, 1959 2 Sheets-Sheet 1

INVENTOR
RUSSELL E. WINN

BY Frank R. Trifari
AGENT

March 17, 1970 R. E. WINN 3,501,755

MAGNETIC STORAGE MATRIX EMPLOYING MAGNET CORES

Filed April 23, 1959 2 Sheets-Sheet 2

INVENTOR
RUSSELL E. WINN
BY Frank R. Trifari
AGENT

United States Patent Office 3,501,755
Patented Mar. 17, 1970

3,501,755

MAGNETIC STORAGE MATRIX EMPLOYING MAGNET CORES

Russell Edward Winn, Hartfield, England, assignor, by mesne assignments, to U.S. Philips Corporation, New York, N.Y., a corporation of Delaware Filed Apr. 23, 1959, Ser. No. 808,383
Claims priority, application Great Britain, Apr. 23, 1958, 12,891/58
Int. Cl. G11c *5/02, 11/06, 17/00*
U.S. Cl. 340—174 4 Claims The invention relates to devices for the permanent registration of information in a ferromagnetic storage memory, particularly a storage matrix.

A storage matrix comprises ring cores of ferromagnetic material having a rectangular hysteresis loop, these cores being arranged in a plurality of parallel rows and columns. Through each of these cores are taken at least two conductors, of which one is common to all cores of a row, the so-called X-wire, and the other to all cores of the column, the so-called Y-wire.

Each core can be brought into one of two opposite remanence states, corresponding to the binary digits 0 and 1. Reading and writing of the information is carried out so that each core is in the initial remanence state corresponding for example to the binary digit 0, after one writing and one reading operation. After reading-out, the information is therefore no longer available in the cores.

There is the problem of recording information in the storage matrix without this information getting lost during reading or during the supply of new information.

A simple solution of this problem consists in that the cores corresponding to the fixed information pattern are removed from the matrix. The vacancies then correspond to the binary digit 0 and no other information can be written therein. This method has the disadvantage that the fixed information pattern cannot be varied in a simple manner and that a different matrix is required for each variation in the information pattern.

With a further known device the magnetic circuits of the cores which correspond to the fixed information pattern are interrupted. These cores then no longer have any memory function and are, with respect to their effect, virtually removed from the matrix. In this device the cores consist of two half cores, which can be arranged one against the other by means of push-buttons. In order to avoid an air gap between the two core halves, the contact surfaces must match each other very accurately. The disadvantage of this method is, therefore, that the requirements for the machining of the cores are very severe.

In a further known device cores are permanently premagnetized by a direct current passing through an additional winding about the core. This method has the disadvantage that each core must be provided with an additional winding having two connecting terminals, so that the manufacture of the matrix is more difficult.

The invention has for its object to provide a device by which selected cores can be put out of operation in a simple manner without changing the construction of the matrix.

Devices according to the invention for permanent recording of information in a ferromagnetic storage memory by putting out of operation selected cores in accordance with the said information and having permanent premagnetisation, are characterized in that provision is made of permanent magnets in contact with or in the immediate proximity of the said selected cores.

According to a further aspect of the invention the permanent magnets are movable in guide members opposite the cores of the storage matrix and can be brought in contact with the cores corresponding to the fixed information pattern by external means.

The invention will be described more fully with reference to the drawing.

Figures 1, 2, 3, 4:
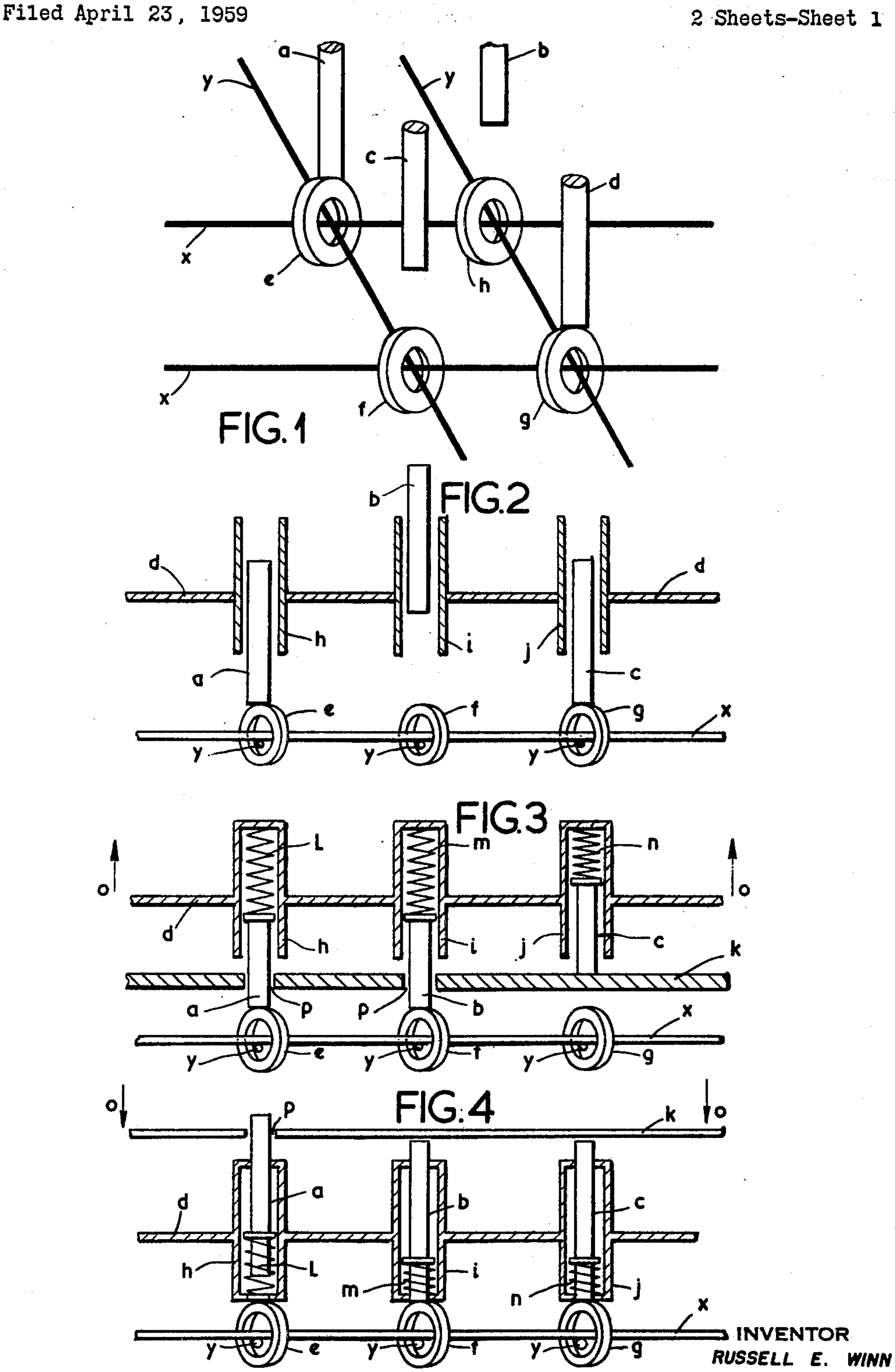
FIG. 1 shows the principle of a device according to the invention.
FIGURES 2 to 7 show different embodiments.

As shown in FIG. 1, the magnetic ring cores *e, f, g,* and *h* form part of a matrix (not shown). The conductors *x* and *y* are the conductors of a row and of a column respectively. The permanent magnets *a, b, c* and *d* are movable in a direction at right angles to the plane of the matrix. The permanent magnet *a* is in contact with the ring core *e* and the permanent magnet *d* is in contact with the ring core *g*. The permanent magnets *b* and *c* are spaced apart from the ring cores *h* and *f* by such a distance that these cores are not affected. The cores *e* and *g* are, in this example, the selected cores, which are premagnetized by the permanent magnets *a* and *d* so that current pulses passing through the conductors *x* and *y* do not change the magnetic state of these cores.

As shown in FIG. 2 the permanent magnets *a, b* and *c* are movable in the guide members *h, i* and *j*, which are provided in recesses of flat plate *d* at a certain distance from and parallel to the plane of the matrix. By external means the permanent magnets *a* and *c* are in contact with the cores *e* and *g*. It is thus possible to select the cores of the matrix to be premagnetized with the aid of external means.

According to FIG. 3 the permanent magnets *a, b* and *c* are movable in guide members *h, i* and *j*, which are closed at one end. In these guide members are arranged springs *l, m* and *n*, which tend to move the permanent magnets *a, b* and *c* toward the cores *e, f* and *g*. Between the plate *d*, in which the guide members are fastened, and the plane of the matrix provision is made of a flat plate *k* with recesses opposite the selected cores. The permanent magnets can thus enter into contact only with these selected cores. According to FIG. 3 the permanent magnets *a* and *b* are in contact with the cores *e* and *f* via the recesses *p* in the plate *k*. The information pattern can be varied by replacing the plate *k* by a different plate *k* with recesses opposite the cores corresponding to the new information pattern.

The embodiment shown in FIG. 4 is the opposite of the embodiment of FIG. 3. The magnets *a, b* and *c* are moved away from the cores *e, f* and *g* by the springs *l, m* and *n*. This movement is restrained, however, by the plate *k*, in which recesses *p* are provided opposite the non-selected cores.

Figure 5:
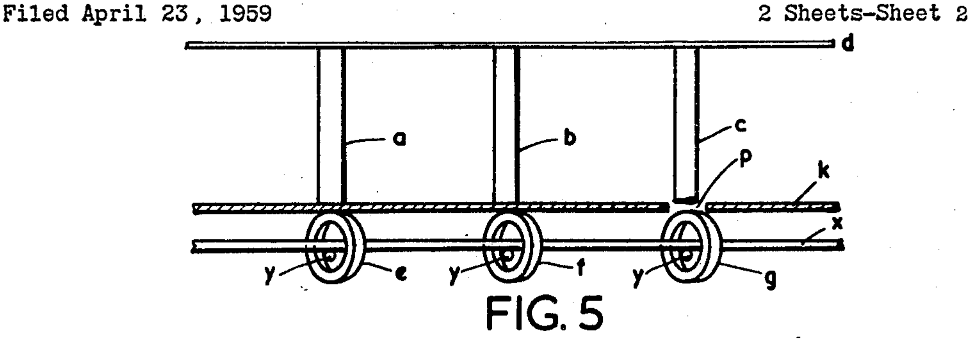

According to FIG. 5 the permanent magnets *a, b* and *c* are fastened to the flat plate *d* opposite the cores *e, f* and *g*. As in the foregoing embodiments a permanent magnet is provided opposite each core of the matrix. In this embodiment the effect of the permanent magnets is suppressed by a plate *k* with a low reluctance, this plate having openings opposite the selected cores, so that only these cores are premagnetized by the field of the permanent magnets.

Figure 6:
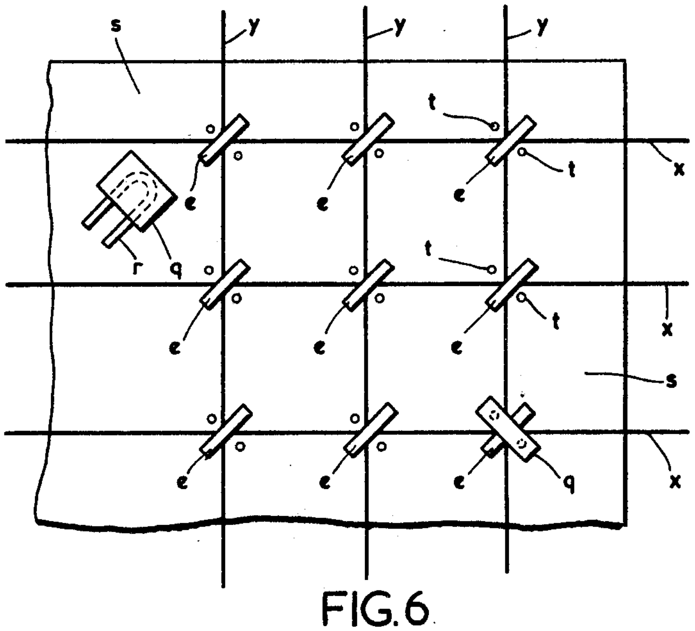

In the embodiment of FIG. 6 a flat plate *s* is arranged parallel to the plane of the matrix and has recesses *t* on either side of the cores *e*. The limbs *r* of a horseshoe-iron magnet *q* can be inserted into the recesses *t*. The selection of the cores is therefore carried out by inserting the horseshoe magnet into the recesses *t*.

Figure 7:
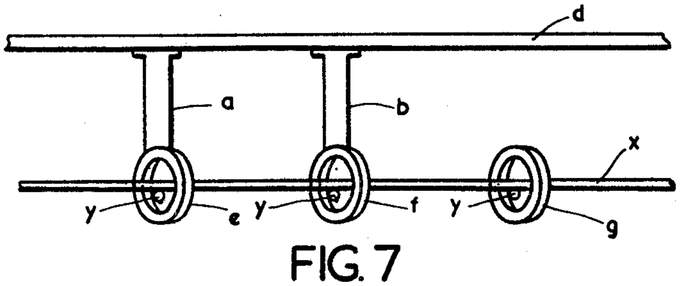

In the embodiment shown in FIG. 7 the permanent magnets are fastened to a flat plate *d* and only those permanent magnets are provided which correspond to the selected cores. In this embodiment only the permanent magnets *a* and *b* are provided opposite the selected cores *e* and *f*. The change in information pattern is carried out by replacing the plate *d* with the permanent magnets.

What is claimed is:

1. A magnetic storage device comprising a plurality of magnetic core elements arranged in rows and columns to form a matrix in a plane, said magnetic elements each being constituted of ferromagnetic material having a rectangular hysteresis loop and possessing two stable opposite remanence states, a pair of conductors threaded through each of said magnetic elements, and means for permanently recording information in said device by disabling selected elements of the matrix, said disabling means including a plurality of permanent magnets mounted in a plane parallel to the matrix plane and arranged substantially similarly to the magnetic elements and each capable of premagnetizing one of said magnetic elements when in close proximity thereto and thus effectively removing the said premagnetized element from the matrix, and means for moving selected ones of the permanent magnets in a direction substantially perpendicular to the matrix plane each into the close proximity of one of said selected elements.

2. A magnetic storage device comprising a plurality of magnetic core elements arranged in rows and columns to form a plane matrix, said magnetic elements each being constituted of ferromagnetic material having a rectangular hysteresis loop and posessing two stable opposite remanence states, reading and writing conductors coupled to each magnetic element, and means for permanently recording information in said device by disabling selected elements of the matrix, said disabling means including a plurality of permanent magnets arranged in a plane substantially parallel to the matrix plane in rows and columns in registration with that of the magnetic elements, said permanent magnets being movable along a given path from a first position remote from the magnetic elements to a second position in close proximity thereto whereby it is capable of premagnetizing the proximate magnetic element and thus effectively remove the said premagnetized element from the matrix, and a plate-like member disposed on one side of said magnets and containing recesses in an array related to the selected magnetic elements for bringing selected ones of said permanent magnets each into the close proximity of one of said selected elements.

3. A device as set forth in claim 2 wherein means are provided urging the magnets from their first to their second position, and the plate-like member is disposed in a plane between the magnets and the matrix and its recesses enable the selected magnets to pass through to the selected elements.

4. A device as set forth in claim 2 wherein means are provided urging the magnets from their second to their first position, and the plate-like member is disposed in a plane remote from the matrix and its recesses enable the non-selected magnets to pass through away from the non-selected elements.

References Cited

UNITED STATES PATENTS

| | | | |
|---|---|---|---|
| 2,741,757 | 4/1956 | Devol et al. | 340—174 |
| 2,781,503 | 2/1957 | Saunders | 340—174 |
| 2,814,031 | 11/1957 | Davis | 340—174 |
| 2,820,216 | 1/1958 | Gottrup | 340—174 |

JAMES W. MOFFITT, Primary Examiner